US008884740B2

(12) United States Patent
Kuebler et al.

(10) Patent No.: US 8,884,740 B2
(45) Date of Patent: Nov. 11, 2014

(54) METHOD FOR ACTUATING A FUNCTION OF A VEHICLE FROM A LARGE DISTANCE

(75) Inventors: Heiko Kuebler, Hitzhofen (DE); Eckart Donner, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/113,933

(22) PCT Filed: Mar. 31, 2012

(86) PCT No.: PCT/EP2012/001432
§ 371 (c)(1),
(2), (4) Date: Oct. 25, 2013

(87) PCT Pub. No.: WO2012/146342
PCT Pub. Date: Nov. 1, 2012

(65) Prior Publication Data
US 2014/0055236 A1    Feb. 27, 2014

(30) Foreign Application Priority Data
Apr. 27, 2011   (DE) .......................... 10 2011 018 749

(51) Int. Cl.
*B60R 25/00* (2013.01)
*B60R 25/10* (2013.01)
*B60R 25/04* (2013.01)
*F02M 1/16* (2006.01)
*B60R 16/037* (2006.01)
*G07C 9/00* (2006.01)
*B60R 25/24* (2013.01)

(52) U.S. Cl.
CPC .......... *B60R 16/037* (2013.01); *G07C 9/00174* (2013.01); *B60R 25/24* (2013.01); *B60R 2325/205* (2013.01)
USPC ................... 340/5.72; 340/426.36; 307/10.5; 123/179.2

(58) Field of Classification Search
CPC .............. G07C 9/00309; G07C 2009/00825; G07C 2009/00865
USPC .................. 340/5.61, 5.72, 426.36; 307/10.5; 123/179.2
See application file for complete search history.

(56) References Cited

U.S. PATENT DOCUMENTS 7,394,350 B2 * 7/2008 Yoshida et al. .......... 340/426.11
7,426,275 B2 * 9/2008 Sugawara ..................... 380/264
(Continued)

FOREIGN PATENT DOCUMENTS

| DE | 102005009490 | 9/2006 |
| DE | 102005020668 | 10/2006 |
| DE | 602004002272 | 8/2007 |
| DE | 60037898 | 1/2009 |
| DE | 102008061304 | 7/2009 |

(Continued)

OTHER PUBLICATIONS

English language translation of International Preliminary Report on Patentability for PCT/EP2012/001432, mailed Oct. 31, 2013, 5 pages.

(Continued)

*Primary Examiner* — George Bugg
*Assistant Examiner* — Munear Akki
(74) *Attorney, Agent, or Firm* — Staas & Halsey LLP

(57) ABSTRACT

A method for activating a function of a vehicle, which is associated with a key which wirelessly interchanges data with the vehicle, is carried out with the aid of a telecommunications device which is different from the key. However, the telecommunications device attempts to communicate with the key in order to make the method safe. During communication with the key, an item of information is obtained and is compared with an item of comparative information.

17 Claims, 2 Drawing Sheets

(56) References Cited

U.S. PATENT DOCUMENTS

| | | | |
|---|---|---|---|
| 8,180,522 B2 * | 5/2012 | Tuff | 701/33.4 |
| 8,335,304 B2 * | 12/2012 | Petite | 379/155 |
| 2004/0104804 A1 * | 6/2004 | Sugawara | 340/5.61 |
| 2004/0207509 A1 * | 10/2004 | Mlynarczyk et al. | 340/5.23 |
| 2005/0225429 A1 | 10/2005 | Burzio | |
| 2005/0277438 A1 * | 12/2005 | Tilk et al. | 455/556.1 |
| 2006/0294429 A1 * | 12/2006 | Natsume | 714/31 |
| 2008/0098134 A1 * | 4/2008 | Van Acht et al. | 710/33 |
| 2008/0140265 A1 | 6/2008 | Hong et al. | |
| 2008/0266051 A1 | 10/2008 | Taki et al. | |
| 2009/0273438 A1 * | 11/2009 | Sultan et al. | 340/5.7 |
| 2010/0102927 A1 * | 4/2010 | Monig | 340/5.64 |
| 2011/0312273 A1 * | 12/2011 | Harris | 455/41.2 |
| 2012/0213362 A1 * | 8/2012 | Bliding et al. | 380/44 |

FOREIGN PATENT DOCUMENTS

| | | | |
|---|---|---|---|
| DE | 102008007121 | 8/2009 | |
| DE | 102009006979 | 8/2009 | |
| DE | 102008039156 | 2/2010 | |
| DE | 102009035654 | 2/2011 | |
| EP | 1000826 | 5/2000 | |
| EP | 1216900 | 6/2002 | |
| EP | 2264980 | 12/2010 | |
| EP | 2264980 A1 * | 12/2010 | H04L 29/08 |
| JP | 2005-299119 | 10/2005 | |

OTHER PUBLICATIONS

English language copy of International Search Report for PCT/EP2012/001432, mailed Oct. 7, 2013, 3 pages.

* cited by examiner

METHOD FOR ACTUATING A FUNCTION OF A VEHICLE FROM A LARGE DISTANCE

CROSS REFERENCE TO RELATED APPLICATIONS

This application is based on and hereby claims priority to International Application No. PCT/EP2012/001432 filed on Mar. 31, 2012 and German Application No. 10 2011 018 749.9 filed on Apr. 27, 2011, the contents of which are hereby incorporated by reference.

BACKGROUND

The invention relates to a method for activating a function of a vehicle, which is associated with a key which wirelessly interchanges data with the vehicle.

The function is intended to be able to be activated with the method, in particular from a distance which is too large for interchanging data with the key. It is appropriate here to use a (particularly portable) telecommunications device, for example a mobile radio telephone, which is different from the key in order to pass a command for activating the function to the vehicle via a telecommunications link (via mobile radio).

For example, it is conceivable for the function to be activated to concern the auxiliary heating of the vehicle. The user of the vehicle has parked the latter at an airport, has flown to a different location and is just about to board the aircraft back to the vehicle. The user wants the vehicle to be preheated when he arrives there again. However, in order to operate the auxiliary heating, it must be ensured that the vehicle is on particular terrain where there is no danger of fire. The situation in which another user, for example the user's wife, has moved the vehicle away and the vehicle is then on different terrain than the user thinks should be avoided.

If the desire is therefore to activate a function of a vehicle with the aid of a telecommunications device, rather than with the vehicle key, a sufficient level of safety must be ensured.

DE 10 2009 035 654 A1 discloses the practice of mechanically coupling a vehicle key to a radio module. In this case, provision may also be made for there to be a communication link between the vehicle key and the radio module. However, in DE 10 2009 035 654 A1, all commands are passed to the vehicle solely by the vehicle key. Therefore, it is not possible to activate functions of a vehicle from a distance which is too large for interchanging data with the key.

EP 1 216 900 A1 describes a remote communication system for a motor vehicle, a first communication unit being arranged in the vehicle and a portable second communication unit, for example a key, being wirelessly and communicatively connected to a telecommunications unit, for example a mobile telephone, which can be used to transmit data in a bidirectional manner between the portable communication unit and the first communication unit in the vehicle over long distances, in particular for the purpose of activating a function of the vehicle. In addition, the second communication unit may comprise a biometric sensor in order to identify a user and to prevent unauthorized remote operation of the motor vehicle. Furthermore, the two communication units may comprise an identification unit. In this case, an identification code may be transmitted, for example, from the second communication unit to the first communication unit. If the identification code is accepted by the first communication unit, a communicative link may be established. If a plurality of portable second communication units are associated with the vehicle, each portable communication unit is assigned a rank, with the result that, in the event of contradictory commands from two or more portable communication units, priority is given to that command from the portable communication unit with the higher rank.

US 2006/294429 A1 describes a method for deleting a local operation which was previously carried out, in particular activation of a function of a vehicle. In this case, when a function of a vehicle is activated by a key, data relating to this function, the key ID and the activation time and date are first of all stored in a memory element connected to the key and in a further memory element in the vehicle. If the activated function is intended to be deactivated by a key from a great distance, the information stored in the key is compared with the information stored in the vehicle and the activated function is deactivated only if the items of information correspond. In this case, an item of comparative information is not obtained for the purpose of activating a function.

EP 2 264 980 A1 describes a communication system having a telematic unit fixed to the vehicle and a communication device which is communicatively connected to the telematic unit. In this case, a plurality of communication paths are available, by which the communication device can communicate with the telematic unit and which have a different range. In this case, a suitable communication path can be selected on the basis of the distance between the communication device and the telematic unit. Furthermore, the communication device may also comprise security data for authorizing communication between the communication device and the telematic unit.

SUMMARY

One possible object is to enable remote activation of a function of a vehicle which is sufficiently safe.

According to the inventors' proposals, a function of a vehicle, which is associated with a key which wirelessly interchanges data with the vehicle, is activated with the aid of a telecommunications device which is different from the key. The telecommunications device is connected to the key in order to establish communication and receives an item of information from the key. The information is compared with an item of comparative information and a function of the vehicle is activated if the information corresponds to the comparative information (according to a predetermined criterion), the comparative information representing an item of information relating to the key used last to activate a function on the vehicle.

The proposals thus involve the telecommunications device searching for the key, in particular in its environment, and the key is included in the method sequence in this manner. Everything which can be implemented by the key with respect to safety can therefore now also be implemented by the telecommunications device.

One particularly preferred embodiment involves the telecommunications device first of all obtaining the comparative information from the vehicle (for example, a mobile radio telephone thus calls the vehicle and receives the comparative information in response). After receiving the information during or as a result of communication with the key, the telecommunications device then transmits an activation signal to the vehicle if the information received corresponds to the comparative information.

In this manner, the software implemented on the telecommunications device ensures a sufficient level of safety, with the result that there is no need to install software matching the software of the telecommunications device on the vehicle and/or the key if the basic functionality of interchanging data is provided. The responsibility for the method therefore lies with the telecommunications device, which can be conveniently equipped with corresponding software ("applet").

As an alternative to this embodiment, it is naturally also possible, in principle, for the telecommunications device to first of all receive an item of information as a result of communication with the key and to forward this information, together with an activation signal, to the vehicle. However, unlike in the embodiment described above, this activation signal does not immediately activate a function, but rather the vehicle compares the forwarded information with an item of comparative information stored in a memory of the vehicle. The vehicle then automatically activates the function if the items of information correspond to one another. In this case, it is necessary for the vehicle itself to be equipped with a functionality comprising the reception of information, the comparison with comparative information and the automatic activation of a further functionality. However, this embodiment is advantageous if an automobile manufacturer would already like to provide particular functionalities in a visible manner.

In one embodiment, the information obtained identifies the key as one of a plurality of vehicle keys. In this case, if the telecommunications device attempts to set up a communication link to the key, the key only needs to emit a conventional response signal which identifies it. There is no need to transmit separate information. This embodiment is impressive as a result of its simplicity.

On the other hand, it is possible for the information received to be an item of information which is transmitted by the key and was stored on the latter after the key last interchanged data with the vehicle. For example, the transmitted information may comprise the time of the last ignition change, that is to say when the vehicle was last switched on or off. If the time of the ignition change stored on the key is compared with the time of the last ignition change stored in the motor vehicle, it is possible to avoid the situation in which the vehicle has been moved away with the aid of a key other than the key carried together with the telecommunications device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
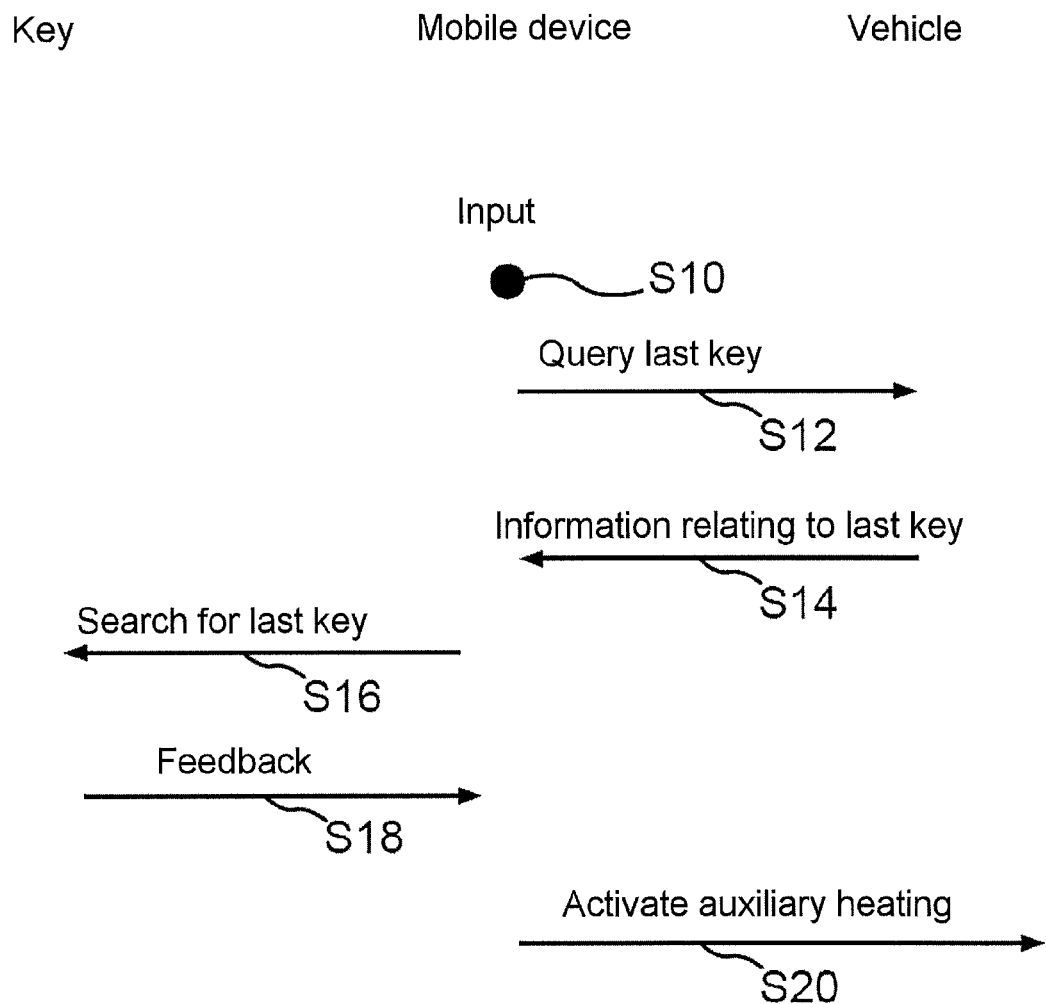
FIG. 1 is a diagram for explaining the sequence of steps in a first embodiment of the proposed method.
Figure 2:
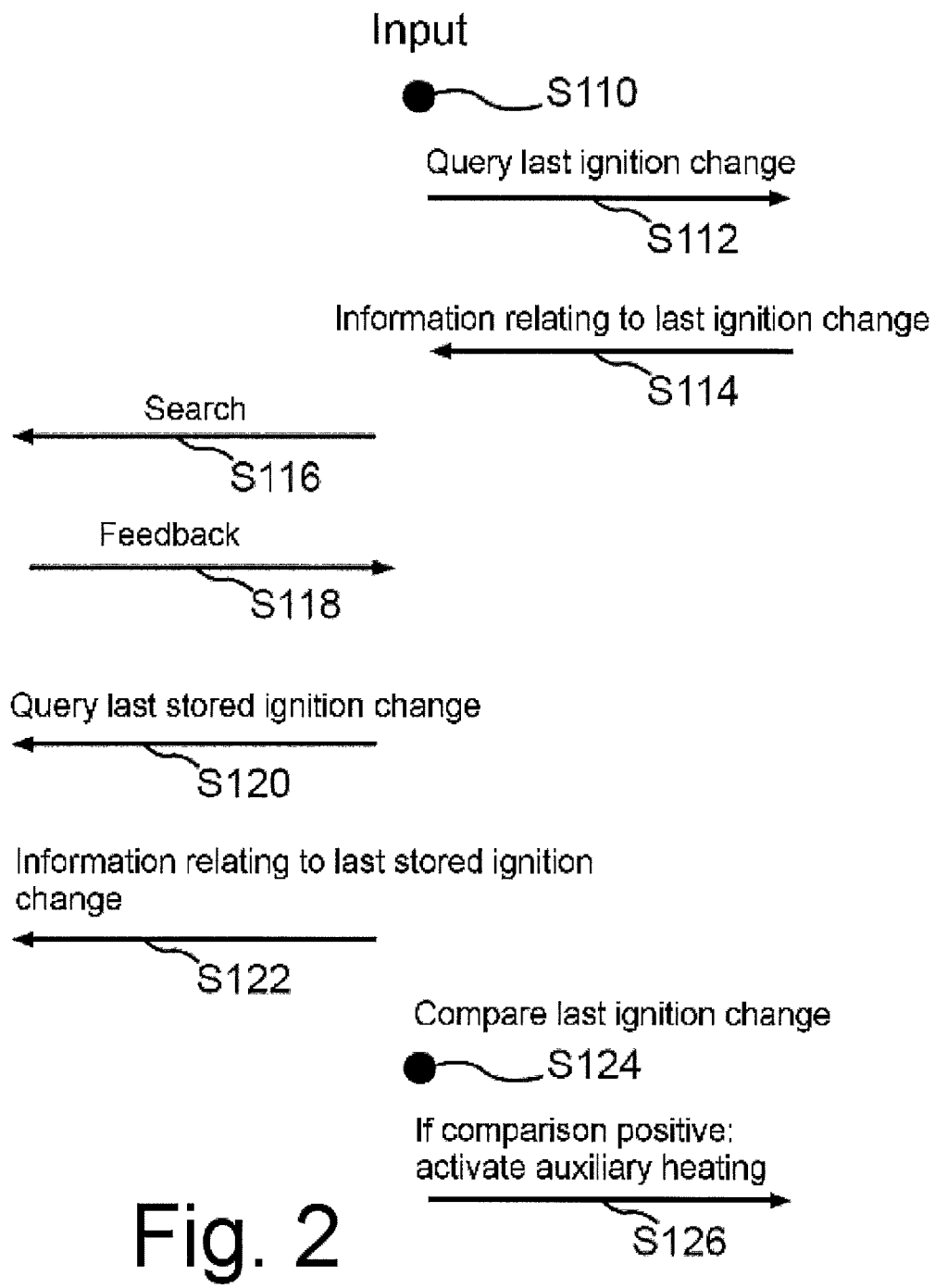
FIG. 2 is a corresponding diagram for explaining a sequence of steps in a second embodiment of the proposed method.

Reference will now be made in detail to the preferred embodiments of the present invention, examples of which are illustrated in the accompanying drawings, wherein like reference numerals refer to like elements throughout.

The present case starts from the basic situation in which a vehicle has been moved with the aid of a particular key and has then been parked. The vehicle driver takes the key with him and simultaneously carries a mobile device (mobile radio telephone). He proceeds to a location which is so far away from the vehicle that it is not possible to establish a wireless link between the key and the vehicle.

However, the present case assumes that the mobile device can communicate with the vehicle, in particular via a mobile radio network, and that the mobile device can simultaneously communicate with the key, in particular via a Bluetooth interface or another wireless interface.

The first embodiment of the proposed method begins with an input in step S10, by which the user attempts to activate the auxiliary heating of the vehicle. The user knows that he has parked the vehicle on terrain on which the auxiliary heating can be safely operated.

After the input in step S10, the mobile device automatically transmits a query to the vehicle in step S12 in order to find out from the vehicle what key was used last to activate a function on the vehicle. The vehicle receives this query and automatically transmits the information regarding the key used last to the mobile device in step S14. The information is represented, for example, in the form of a key code which can also be used for the communication interface between the mobile device and the key. The mobile device then searches for the key used last in step S16. It is sufficient for the key to provide feedback in step S18 so that it is clear that exactly the key which was used last to move the vehicle is located in the region of the mobile device. It is thus clear that the vehicle has not been moved away from the terrain on which the user parked it. Therefore, the mobile network automatically activates the auxiliary heating of the vehicle in step S20. No further check of the activation signal takes place in the vehicle.

In a second embodiment of the proposed method, an input, according to which the auxiliary heating should be activated, is made by the user in step S110. In a query in step S112, the mobile device now queries with the vehicle when the time of the last ignition change was. As long as the vehicle has not been moved by anyone else, this is the time at which the ignition of the vehicle was switched off by the present user.

In step S114, the vehicle automatically transmits the information relating to the last ignition change.

The mobile device now generally searches for (vehicle) keys or specifically for a particular key whose code is stored in it, see step S116. The device then receives feedback from the key in step S118, with the result that a communication link has been established between the key and the mobile device. In step S120, the mobile device then automatically transmits a request for the ignition change stored in the key. It is assumed here that, for each ignition change, the corresponding time is stored in the key. The information relating to the ignition change stored last is then transmitted from the key to the mobile device in step S122. The device can now compare the two items of information received from the vehicle, on the one hand, and from the key, on the other hand, with one another in step S124. If said ignition changes correspond to one another, this means that the vehicle has not been moved with the aid of another key, that is to say that no further ignition change took place. It is therefore ensured that the vehicle is on exactly the terrain on which its user parked it. In step S126, the auxiliary heating can therefore be activated, to be precise automatically by the mobile device, and the vehicle only reacts thereto.

The method in the embodiments described is initiated and carried out by the mobile device. This has the advantage that it is possible to carry out the method by implementing suitable software on the mobile device ("applet"). As an alternative, it is possible to allow some portions of the method to be carried out by the vehicle. Although an input would then have to be made on the mobile device and communication with the key would also be effected by the mobile device, other steps, for instance the comparison of obtained information, could then be carried out in the vehicle itself.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide V. DIRECTV, 69 USPQ2d 1865 (Fed. Cir. 2004).

The invention claimed is:

1. A method for activating a first function of a vehicle using an associated proximate key, which wirelessly interchanges data with the vehicle, and a telecommunications device which is different from the proximate key, comprising:
   connecting the telecommunications device to the proximate key to establish communication;
   receiving, at the telecommunications device, an item of information from the proximate key;
   comparing the item of information with comparative information, the comparative information relating to an identity of a last used key, which was last used to activate a second function of the vehicle; and
   remotely activating the first function of the vehicle via a mobile radio network, using the telecommunications device, the first function being activated only if the comparing indicates the item of information corresponds to the comparative information,
   wherein the telecommunications device is disposed remotely from the vehicle.

2. The method as claimed in claim 1, wherein
   the telecommunications device obtains the comparative information from the vehicle, and
   after receiving the item of information, the telecommunications device transmits an activation signal to the vehicle if the item of information corresponds to the comparative information.

3. The method as claimed in claim 1, wherein
   the telecommunications device forwards the item of information together with an activation signal, to the vehicle,
   the comparative information is stored in a memory of the vehicle, and
   the vehicle compares the item of information with the comparative information and automatically activates the first function if the item of information corresponds with the comparative information.

4. The method as claimed in claim 1, wherein
   there are a plurality of vehicle keys,
   the proximate key is one of the plurality of keys, and
   the item of information identifies the proximate key, which has established communication with the telecommunications device.

5. The method as claimed in claim 1, wherein
   the item of information received at the telecommunications device, was transmitted from the vehicle to the proximate key when the proximate key last interchanged data with the vehicle, and
   after being transmitted from the vehicle, the item of information was stored on the proximate key.

6. The method as claimed in claim 1, wherein the telecommunications device is a mobile telephone.

7. The method as claimed in claim 1, wherein the proximate key wirelessly interchanges data with the vehicle when the proximate key is within communication range of the vehicle.

8. The method as claimed in claim 1, wherein the proximate key wirelessly interchanges data with the telecommunications device when the proximate key is within communication range of the telecommunication device.

9. The method as claimed in claim 1, wherein
   the proximate key wirelessly interchanges data with the vehicle when the proximate key is within communication range of the vehicle, and
   the telecommunications device receives a user input to activate the first function when the proximate key is not within communication range of the vehicle.

10. The method as claimed in claim 1, wherein the telecommunications device receives a user input to activate the first function.

11. The method as claimed in claim 10, wherein after the telecommunications device receives the user input, the telecommunications device requests the comparative information from the vehicle.

12. The method as claimed in claim 10, wherein after the telecommunications device receives the user input, the telecommunications device searches for keys in communication range with the telecommunications device.

13. The method as claimed in claim 1, wherein
   the item of information identifies when the proximate key last activated the second function, and
   the comparative information identifies when the second function was last activated in the vehicle.

14. The method as claimed in claim 1, wherein the item of information corresponds to the comparative information when the proximate key is the same as the last used key.

15. The method as claimed in claim 1, wherein
   the first function is the same as the second function.

16. The method as claimed in claim 1, wherein
   the second function corresponds to a function which was most recently activated on the vehicle and the first function corresponds to a different function than the first function.

17. The method as claimed in claim 1, wherein
   the telecommunications device is a mobile telephone and the comparing the item of information with the comparative information is performed by the mobile telephone.

* * * * *